May 24, 1927. 1,630,079
J. E. SPALDING ET AL
FILTER
Filed June 20, 1924   2 Sheets-Sheet 2
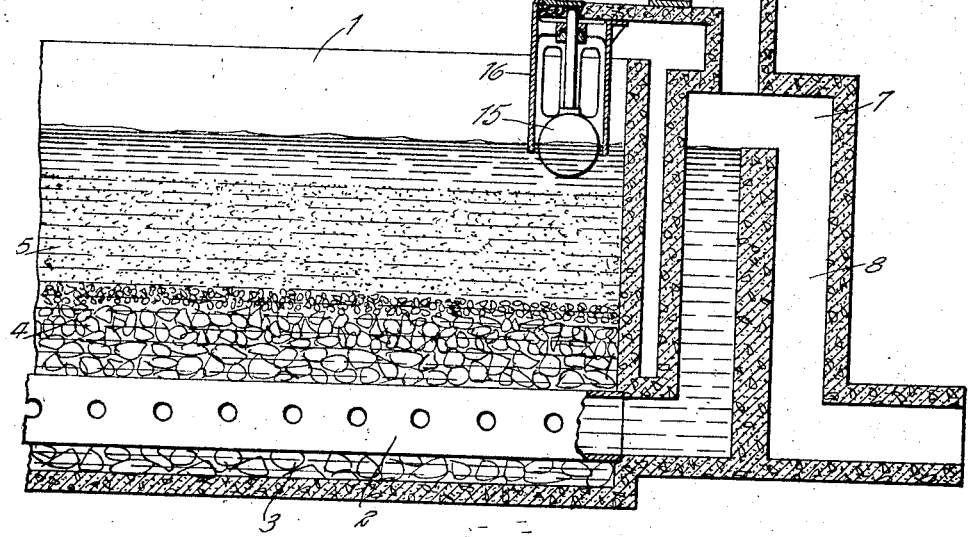
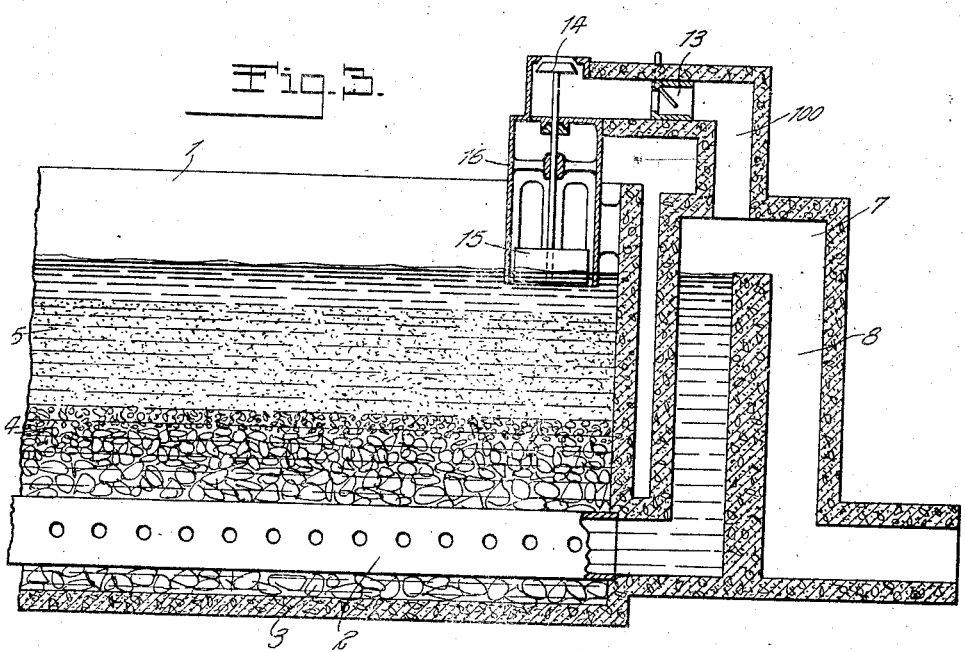
Inventor
JAMES E. SPALDING
AND ROBERT L. ARCHER
per
Attorney Patented May 24, 1927.

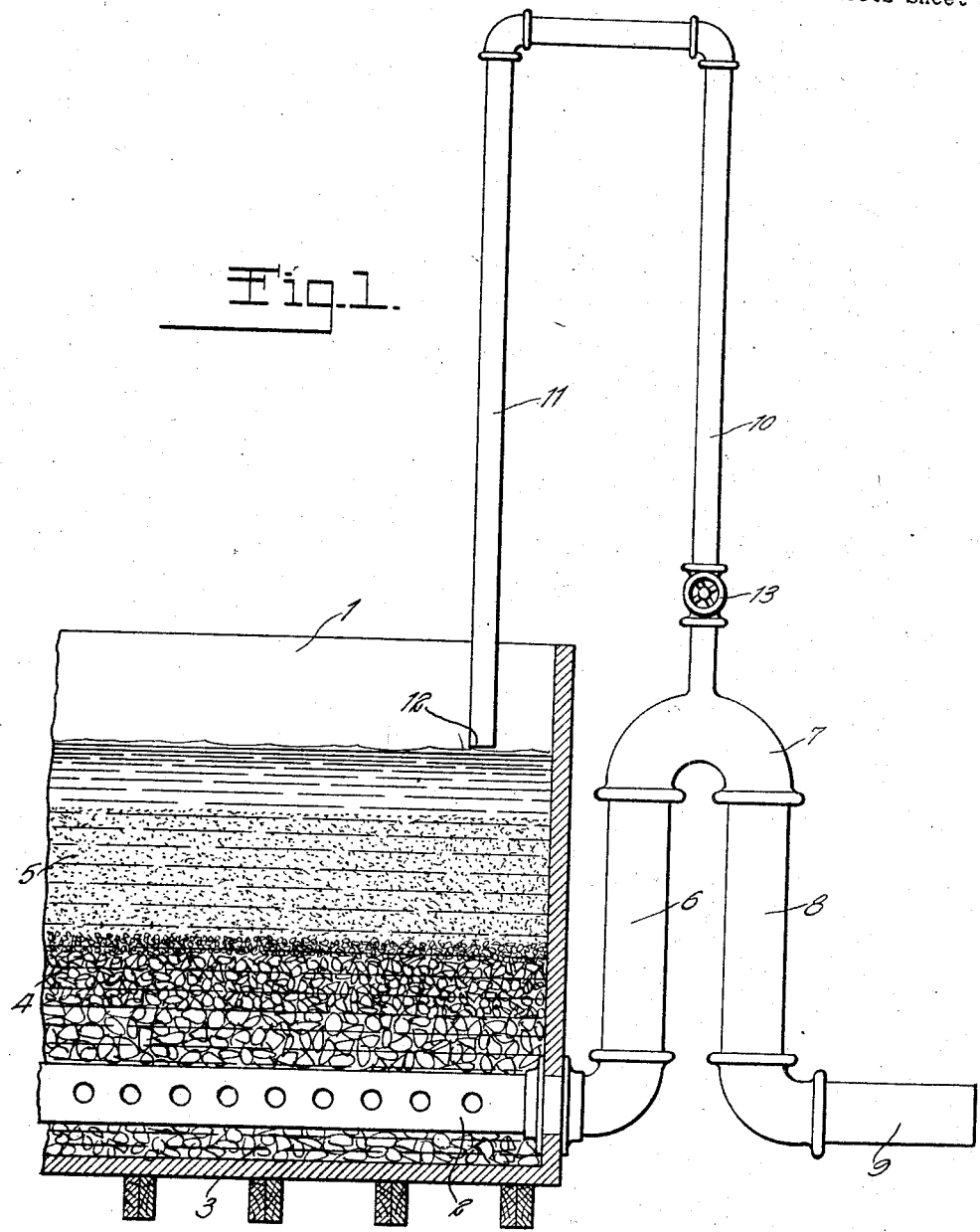

1,630,079

UNITED STATES PATENT OFFICE.

JAMES E. SPALDING AND ROBERT L. ARCHER, OF COLLINSVILLE, ILLINOIS.

FILTER.

Application filed June 20, 1924. Serial No. 721,169.

This invention pertains to filters and more particularly to that type of filter in which a sand bed or similar arrangement is used as the filtering medium.

In the construction of the ordinary sand bed filter, a tank or container is provided having an outlet for the filtered water at the bottom thereof. A quantity of coarse gravel is usually packed in the bottom of such a container and around the outlet which may take the form of a perforated pipe extending along the bed, or a trough covered by a grating or any other well known device for this purpose. The course of gravel completely surrounds or covers the outlet and has laid upon it a course of finer gravel. The fineness of the gravel is thus graded from the bottom to the top of the bed and finally a top course of fine sand is laid covering the entire bed. The sand portion of the bed is usually of a thickness of one-and-one-half to two feet but sometimes more.

In the operation of such a filter, the liquid to be filtered is run in at the top of the bed. The liquid finds its way to the outlet by percolating through the sand and gravel. During this process, the various matters in suspension in the liquid are separated out and deposited in the sand. After such a filter bed has been in operation for a certain time, there is formed, particularly in the case of a water filter, a deposit or scum which covers the top of the bed over the sand. This scum is of a gummy or gelatinous nature and for a certain time after its formation renders material assistance in the filtering operation. Bacteria and certain fine suspended matter are caught and held in this scum.

Occasionally a filter of this kind is intermittent in its operation. This may be due to variation in the supply of liquid or to an intermittent demand so that the filter is shut down at intervals. As the outlet connection is ordinarily at the bottom of the bed, cutting off the liquid supply to the filter will often result in draining the bed entirely of liquid. When this happens and the filter is idle for a period, the sand may dry out completely. When this happens it is often difficult upon resuming operations to get the filter to work properly. The surface scum has been broken up and dried and the suspended matter held in the bed has become dried, and this tends to clog the bed and prevent normal operation until the whole can again become completely saturated and the surface scum reformed. The result is that a quantity of liquid passed through the filter after resuming operation must be discarded as it has not been properly filtered.

One of the objects of this invention is to provide a filter of this type in which these objectionable features will be overcome.

Another object is to provide a filter in which the level of the liquid will be maintained at all times even during intermittent operation.

Further objects will appear from the following description taken in connection with the accompanying drawing, in which—

Figure 1 is a sectional view of a sand filter bed embodying this invention.

Figure 2 is a similar view illustrating another embodiment of this invention; and Figure 3 is a similar view illustrating still another embodiment of this invention.

Referring now to the drawing and more particularly to Figure 1, 1 designates a tank or basin of any suitable construction designed to contain the filter bed, 2 designates a perforated outlet pipe for the filtered liquid. Placed in the bottom of the bed and covering the pipe 2 is a course of coarse gravel 3 upon which may be laid one or more courses of finer gravel 4 and upon this a course of sand 5. The liquid is run into the filter bed at the top by an inlet (not shown) and percolates through the sand and gravel to the outlet pipe. These parts may be of any usual well known construction and will therefore need no further description.

Connected with the outlet pipe 2 on the outside of the filter bed is a conduit 6 which rises outside of the bed to the height of the liquid in the bed where it is joined by a suitable connection 7 to a descending conduit 8 connected to a discharge conduit 9 by which the liquid is led away to the place where it is to be used. Connected with the connection 7 at the upper point of the conduit 6 is a vent pipe 10 which rises to a suitable height above the filter where it is joined to a descending pipe 11 having a downwardly directed open end 12 terminating a short distance above the level of the sand in the bed and approximately at the mean level of the liquid to be maintained.

The filtered liquid which collects in the outlet pipe 2 passes out through the rising conduit 6 and the descending conduit 8 to the discharge conduit 9. When the level of the liquid is high enough that the end 12 of the vent pipe is submerged, the flow of liquid through the conduits 6 and 8 will tend to exhaust the air in the connection 7 and the vent pipes 10 and 11. The pipe 10 must therefore rise to a sufficient height that the vacuum so formed will not tend to draw the unfiltered liquid up from the end 12 through the pipe 11. The establishment of a vacuum in the connection 7 will cause the rising and the falling conduits 6 and 8 to act as a siphon, tending to produce a suction at the outlet of the filter so as to hasten the flow through the filter bed. There is thus established the effect of a pressure filter and the quantity of liquid handled is accordingly increased. As the supply of liquid decreases and the level of the liquid in the bed falls, the end 12 of the vent pipe will eventually be uncovered so as to admit the atmosphere to the connection 7 to break the vacuum therein. If the flow of liquid to the filter should then be stopped, the filtered liquid in the conduit 8 could flow off without drawing with it the liquid in the rising conduit 6 by siphoning action. There will thus remain in the conduit 6 a column of liquid equal in height to that in the filter bed and therefore balancing the same so as to obviate any tendency to drain the bed. The bed is thus maintained with a certain depth of liquid therein so as to keep it wet and to preserve the filtering scum which forms on the sand. The admission of the atmosphere above the column in the conduit 6 serves to break the siphoning action of the rising and falling conduits and thus prevents draining of the bed.

The vent pipe 10 may be provided with a shut-off valve 13 which may be manually or otherwise operated at certain times. Such a valve would be closed during the so-called back washing operation by means of which such filter beds are cleaned. During such an operation, the filtered liquid is pumped backward from the discharge conduit 9 into the bottom of the filter bed to flow upwardly therethrough carrying out the deposited impurities and suspended matter and discharging into a suitable waste conduit not shown in the drawing.

In Figures 2 and 3, the invention is illustrated with modified forms of vent devices. These modifications may be used in large installations where the filter basin and the connecting conduits are constructed of concrete or similar material, or where the head room necessary for the vent pipe 10 of Figure 1 is not available. In these embodiments, the rising conduit 6 and the descending conduit 8 together with the connection 7 may be formed of concrete in a well known manner. In this case, the vent tube or conduit 100 may also be formed of concrete instead of pipe as in Figure 1. In this case, however, the end of the vent conduit opens directly to the atmosphere through a suitable valve instead of dipping into the liquid in the filter bed. The end of the conduit 100 may be supplied with a suitable valve 14 operated by a float 15 suitably guided in a bracket 16 and adapted to float on the surface of the liquid in the basin 1. As the level of the liquid rises, this valve is closed, and as the level falls, the valve is opened. When the valve is opened, the atmosphere is admitted above the column of liquid in the conduit 6 so as to break the vacuum and prevent siphoning the liquid from the bed. As the liquid rises, the float operates to close the valve 14 whereupon the flow of liquid through the conduits 6 and 8 will eventually exhaust the air therein and establish a siphoning action, as described for Figure 1.

It will be seen, therefore, that in accordance with this invention, effective means are provided to prevent the liquid from being drawn off of such filter bed. The rising conduit 6 provides that there shall always be a column of liquid at the outlet balancing the liquid in the bed, and the arrangement for automatically opening the vent so as to admit the atmosphere above this column obviates the possibility of its being drawn off so as to destroy the balance. There will thus always be a quantity of liquid in the filter bed so that it will be kept moist and in proper condition to resume filtering operation as soon as a fresh supply of liquid is available. The closing of the vent is also effective to establish a siphoning action to assist in increasing the rapidity of flow through the filter at times when the demand is heavy.

It is obvious that various changes may be made in the details of construction, without departing from the spirit of this invention; it is, therefore, to be understood that this invention is not to be limited to the specific details shown and described.

Having thus described the invention, what is claimed is:

1. In a sand bed filter having a bed in which a quantity of liquid is contained, an ascending outlet conduit leading from said bed, and a descending conduit connected with said first conduit at the normal height of the liquid in the bed, and an adjustable vent for admitting the atmosphere above the liquid in said first conduit in order to prevent draining the liquid from said bed.

2. In a sand bed filter having a bed in which a quantity of liquid is contained, means to withdraw the major portion of the liquid from said filter, an ascending outlet conduit leading from said bed, a descending conduit connected with said first conduit at the normal height of the liquid in the bed, a vent for admitting the atmosphere above the liquid in said first conduit, and means for opening or closing said vent in accordance with the level of the liquid in the bed in order to prevent draining the liquid from said bed.

3. In a sand bed filter having a bed in which a quantity of liquid is contained, means to withdraw the major portion of the liquid from said filter, an ascending outlet conduit leading from said bed, a descending conduit connected with said first conduit at the normal height of the liquid in the bed, and a vent for admitting the atmosphere above the liquid in said first conduit, constructed and arranged to be closed or opened automatically upon rise or fall of the liquid in the bed in order to prevent draining the liquid from said bed.

4. In a sand bed filter having a bed in which a quantity of liquid is contained, an ascending outlet conduit leading from said bed, a descending conduit connected with said first conduit at the normal height of the liquid in the bed, a vent pipe for admitting the atmosphere above the liquid in said first conduit in order to prevent draining the liquid from said bed, and a valve in said vent.

5. In a sand bed filter having a bed in which a quantity of liquid is contained, means to withdraw the major portion of the liquid from said filter, an ascending outlet conduit leading from said bed, a descending conduit connected with said first conduit at the normal height of the liquid in the bed, a vent for admitting the atmosphere above the liquid in said first conduit, and a float valve operated upon rise or fall of the liquid in the bed to close or open said vent in order to prevent draining the liquid from said bed.

6. In a sand bed filter having a bed in which a quantity of liquid is contained, an ascending outlet conduit leading from said bed, a descending conduit connected with said first conduit at the normal height of the liquid in the bed, a vent for admitting the atmosphere above the liquid in said first conduit, means operated upon rise or fall of the liquid in the bed to close or open said vent, and means for closing said vent during back washing operations.

7. A filter for liquids, comprising, a sand bed having an outlet at the bottom thereof, a delivery conduit rising from said outlet and having a return bend at the normal height of the liquid in said bed, and means for breaking the vacuum in said bend in order to prevent draining the liquid from said bed.

8. A filter for liquids, comprising, a sand bed having an outlet at the bottom thereof, a delivery conduit rising from said outlet and having a return bend at the normal height of the liquid in said bed, a vent joining said conduit at said bend, and means for closing or opening said vent in accordance with the rise or fall of the liquid in said bed in order to prevent draining the liquid from said bed.

9. A filter for liquids, comprising, a sand bed having an outlet at the bottom thereof, a delivery conduit rising from said outlet and having a return bend at the normal height of the liquid in said bed, and a vent pipe joining said conduit at said bend and having a downwardly directed open end adapted to be submerged by the rising liquid in said bed, whereby air may be admitted to said conduit in order to prevent draining the liquid from said bed.

10. A filter for liquids, comprising, a sand bed having an outlet at the bottom thereof, a delivery conduit rising from said outlet and having a return bend at the normal height of the liquid in said bed, a vent pipe joining said conduit at said bend and having a downwardly directed open end adapted to be submerged by the rising liquid in said bed, whereby air may be admitted to said conduit in order to prevent draining the liquid from said bed, and a valve in said pipe.

11. In a sand-bed filter having a bed in which a quantity of liquid is contained, means to withdraw the major portion of the liquid from said filter, an ascending outlet conduit leading from said bed, a descending conduit connected with said first conduit at the normal height of the liquid in the bed, and means adapted to prevent draining the liquid from said bed including a vent pipe communicating with the upper part of said conduits and having a downwardly directed opening at the normal level of the liquid in said bed.

12. In a filter having a tank in which a quantity of liquid is contained on a bed of sand or the like, means to withdraw the major portion of the filtrate from said tank comprising a siphon outlet, and means adapted to interrupt the flow of filtrate from said outlet at a predetermined level of the liquid in said tank, in order to prevent draining the liquid from said bed.

13. In a filter having a tank in which a quantity of liquid is contained on a bed of sand or the like, means to withdraw the major portion of the filtrate from said tank comprising a siphon outlet, and means for admitting the air to said siphon adapted to interrupt the flow of filtrate from said outlet at a predetermined level of the liquid in said tank, in order to prevent draining the liquid from said bed.

In testimony whereof we affix our signatures this 14th day of June, 1924.

JAMES E. SPALDING.
ROBERT L. ARCHER.